US010958160B2

(12) United States Patent
Mitev

(10) Patent No.: US 10,958,160 B2
(45) Date of Patent: Mar. 23, 2021

(54) FEEDBACK SCHEME FOR STABLE LDO REGULATOR OPERATION

(71) Applicant: Dialog Semiconductor (UK) Limited, London (GB)

(72) Inventor: Mityu Mitev, Munich (DE)

(73) Assignee: Diaiog Semiconductor (UK) Limited, London (GB)

( * ) Notice: Subject to any disclaimer, the term of this patent is extended or adjusted under 35 U.S.C. 154(b) by 0 days.

(21) Appl. No.: 16/456,216

(22) Filed: Jun. 28, 2019

(65) Prior Publication Data

US 2020/0244160 A1 Jul. 30, 2020

(30) Foreign Application Priority Data

Jan. 30, 2019 (DE) .......................... 102019201195.0

(51) Int. Cl.
*G05F 1/575* (2006.01)
*H02M 3/07* (2006.01)
(Continued)

(52) U.S. Cl.
CPC .............. *H02M 3/07* (2013.01); *G05F 1/565* (2013.01); *G05F 1/575* (2013.01); *H02M 2001/0003* (2013.01)

(58) Field of Classification Search
CPC .................... G05F 1/565; G05F 1/575; H02M 2001/0003; H02M 3/07
See application file for complete search history.

(56) References Cited

U.S. PATENT DOCUMENTS 6,765,374 B1 6/2004 Yang et al.
8,810,224 B2 * 8/2014 Zhang ..................... G05F 1/575
323/280
(Continued)

FOREIGN PATENT DOCUMENTS

DE 10 2017 202 807 8/2018
JP 2534223 2/1997
JP 2004-21577 1/2004

OTHER PUBLICATIONS

German Office Action, File No.: 10 2019 201 195.0, Applicant: Dialog Semiconductor (UK) Limited, dated Jul. 18, 2019, 7 pages, and English language translation, 7 pages.

*Primary Examiner* — Matthew V Nguyen
*Assistant Examiner* — Jye-June Lee
(74) *Attorney, Agent, or Firm* — Saile Ackerman LLC; Stephen B. Ackerman

(57) ABSTRACT

A power converter and method are presented. The power converter may have a pass device, a replica device, a feedback circuit, and a regulation circuit. The pass device may be coupled on a first electrical path between an input terminal of the power converter and an output terminal of the power converter. The replica device may be coupled on a second electrical path between the input terminal and the output terminal, wherein a coupling node is arranged on the second electrical path between the replica device and the output terminal. The feedback circuit may generate, based on a reference voltage and an output voltage at the output terminal, a control signal for controlling both the pass device and the replica device. The regulation circuit may reduce a voltage difference between a coupling voltage at the coupling node and the output voltage at the output terminal of the power converter.

25 Claims, 5 Drawing Sheets

(51) Int. Cl.
*G05F 1/565* (2006.01)
*H02M 1/00* (2006.01)

(56) References Cited

U.S. PATENT DOCUMENTS

| | | | |
|---|---|---|---|
| 2005/0207186 A1* | 9/2005 | Summer | H02H 5/005 |
| | | | 363/20 |
| 2012/0262135 A1 | 10/2012 | Childs | |
| 2013/0293986 A1* | 11/2013 | Lerner | G05F 1/573 |
| | | | 361/18 |
| 2014/0320095 A1* | 10/2014 | Sambucco | G05F 1/46 |
| | | | 323/271 |
| 2016/0124027 A1* | 5/2016 | Sannbucco | G01R 19/0092 |
| | | | 324/76.11 |
| 2018/0239380 A1 | 8/2018 | Ciomaga et al. | |

* cited by examiner

FEEDBACK SCHEME FOR STABLE LDO REGULATOR OPERATION

TECHNICAL FIELD

The present document relates to DC (Direct Current)/DC power converters. In particular, the present document relates to a feedback scheme for stable operation of low-dropout LDO regulators.

BACKGROUND

A low-dropout or LDO regulator is a DC linear voltage regulator capable of regulating the output voltage even when the input voltage is very close to the output voltage. The LDO linear regulator may reduce power consumption by providing a very low voltage drop across the linear regulator. As shown in FIG. 1, a LDO regulator 1 conventionally includes an error amplifier 13 which compares a voltage reference to a sample of an output voltage. The output of the amplifier 13 is coupled via a driver circuit 15 to a control terminal of a pass device 11 which serves to "pass" current from the unregulated input terminal of the LDO regulator 1 to the regulated output terminal of the voltage regulator 1. The feedback control loop formed by the amplifier 13, the driver circuit 15 and pass device 11 implements a negative feedback and forces the control terminal of the pass device 11 to a dynamic voltage value that maintains a regulated voltage at the output terminal of the voltage regulator 1.

One problem in LDO regulators is caused by the external wiring at the input of the LDO regulator 1. As depicted in FIG. 1, said external wiring is modelled by a parasitic resistor $R_{SUP}$ 17 and by the parasitic inductor $L_{SUP}$ 18. In particular the latter parasitic inductor $L_{SUP}$ 18 may cause undesirable oscillations in combination e.g. with the gate-source capacitance of the pass device 11. These oscillations may disturb operation of the feedback control loop, especially when the input voltage is close to the target output voltage. In this situation, a difference between the currents through a replica device 10 and the pass device 11 may reduce stability of the feedback control loop.

In order to counteract the described stability problems, a decoupling capacitor $C_{DECOUP}$ 14 is implemented between the input of the LDO regulator 1 and a reference potential (such as e.g. ground). If the size of said decoupling capacitor $C_{DECOUP}$ 14 is large enough and/or if the negative feedback generated by the feedback control loop is strong enough, the regulation function of LDO regulator 1 remains unaffected by said negative influences of the external wiring.

SUMMARY

The present document addresses the above mentioned technical problems. In particular, the present document addresses the technical problem of providing an LDO regulator with increased feedback loop stability. More specifically, it is an objective to reduce the required size of the decoupling capacitor $C_{DECOUP}$ at the input of the LDO regulator.

According to an aspect, a power converter may comprise a pass device, a replica device, a feedback circuit, and a regulation circuit. The pass device may be coupled on a first electrical path between an input terminal of the power converter and an output terminal of the power converter. The replica device may be coupled on a second electrical path between the input terminal and the output terminal, wherein a coupling node is arranged on the second electrical path between the replica device and the output terminal. The feedback circuit may be configured to generate, based on a reference voltage and an output voltage at the output terminal, a control signal for controlling both the pass device and the replica device. The regulation circuit may be configured to reduce a voltage difference between a coupling voltage at the coupling node and the output voltage at the output terminal of the power converter.

The power converter may be a linear voltage regulator. Specifically, the power converter may be a low-dropout LDO voltage regulator. For example, the pass device may be a pass transistor, the control signal may be applied to a gate of the pass transistor, and the pass transistor may be configured to regulate a first current through the first electrical path. The replica device may be a replica transistor, the control signal may be applied to a gate of the replica transistor, and the replica transistor may be configured to regulate a second current through the second electrical path. At this, the pass transistor and the replica transistor may be identical in shape and proportional in size. For example, the relationship between the pass transistor and the replica transistor may be described in terms of a size ratio or a resistance ratio. Typically, the replica transistor is much smaller than the pass transistor and, hence, the replica transistor has a much higher resistance value than the pass transistor. By reducing said voltage difference between the coupling voltage and the output voltage, a current ratio between the first current and the second current is forced to approach an ideal current ratio which is determined by said size or resistance ratio. As a consequence, stability of the feedback circuit is increased and the required size of a decoupling capacitor—which may be connected between the input terminal of the power converter and a reference potential—may be reduced for a given output capacitor. Furthermore, also the size of the output capacitor at the output terminal of the power converter may be reduced.

The regulation circuit may be configured to reduce said voltage difference by regulating said coupling voltage. Specifically, the regulation circuit may be configured to reduce said voltage difference by regulating said coupling voltage towards the output voltage at the output terminal. More specifically, the regulation circuit may be configured to minimize said voltage difference by regulating said coupling voltage towards the output voltage. In an ideal scenario, the regulation circuit may force both voltages to have equal voltage values.

Moreover, the power converter may further comprise a resistive element coupled on the second electrical path in series with the replica device between the replica device and the output terminal, wherein the coupling node is arranged on the second electrical path between the replica device and the resistive element. On the one hand, the resistive element may be helpful for increasing the stability of the feedback circuit. On the other hand, said resistive element—and a corresponding voltage drop across the resistive element—may change the ideal current ratio between the first current and the second current, which in turn may disrupt operation of the feedback circuit e.g. in case of high load currents and when a voltage difference between the input voltage and the output voltage of the power converter is small. In other words, the regulation circuit may be configured to reduce a voltage difference between a voltage at an output of the replica device and a voltage at an output of the pass device such that the corresponding voltages across the pass device and the replica device become equal.

The regulation circuit may comprise a regulation transistor which is a metal-oxide-semiconductor field-effect transistor MOSFET. Further, the regulation circuit may comprise a voltage controlled current source VCCS whose inputs are connected to the output terminal of the power converter and to the coupling node, respectively, and whose output is coupled to a gate of the regulation transistor. At this, said voltage difference may be reduced by regulating the coupling voltage via a drain-source-channel of the regulation transistor. The VCCS may be an amplifier circuit whose differential input voltage produces an output current. For example, the VCCS may be implemented using an operational transconductance amplifier OTA.

In a first configuration, the regulation transistor may be a p-channel MOSFET, and the regulation circuit may comprise a compensation capacitor coupled between the gate of the regulation transistor and the output terminal of the power converter. In this first configuration, the source of the regulation transistor may be connected to the coupling node and the drain of the regulation transistor may be connected to a reference potential. The inverting input of the VCCS may be coupled to the coupling node and the non-inverting input of the VCCS may be coupled to the output terminal of the power converter.

In a second configuration, the regulation transistor may be an n-channel MOSFET, and the regulation circuit may comprise a compensation capacitor coupled between the gate of the regulation transistor and a reference potential. In this second configuration, the source of the regulation transistor may be connected to the reference potential and the drain of the regulation transistor may be connected to the coupling node. The non-inverting input of the VCCS may be coupled to the coupling node and the inverting input of the VCCS may be coupled to the output terminal of the power converter.

In a third configuration, the regulation transistor may be an n-channel MOSFET, and the regulation circuit may comprise a compensation capacitor coupled between the gate of the regulation transistor and the output terminal of the power converter. In this third configuration, the source of the regulation transistor may be connected to the reference potential and the drain of the regulation transistor may be connected to the coupling node. The non-inverting input of the VCCS may be coupled to the coupling node and the inverting input of the VCCS may be coupled to the output terminal of the power converter.

In all configurations, the regulation circuit may comprise an offset voltage generation unit configured to generate an offset voltage at one of the inputs of the VCCS. For example, in the first configuration, the offset voltage generation unit may be configured to generate a positive offset voltage at the non-inverting input of the VCCS. In the second and third configuration, the offset voltage generation unit may be configured to generate a positive offset voltage at the inverting input of the VCCS.

The regulation circuit may comprise a first transistor coupled between the coupling node and a reference potential. The regulation circuit may comprise a second transistor coupled between the output terminal of the power converter and a source node. In addition, the regulation circuit may comprise a current source coupled between the source node and the reference potential. A gate of the first transistor and a gate of the second transistor may be both connected to the source node. Additionally, a further capacitor may be connected between the source node and the output terminal of the power converter. Preferably, the first transistor may have a lower threshold voltage than the second transistor. In this setup, the above-discussed resistive element may be omitted.

The feedback circuit may comprise an error amplifier configured to generate, at an output of the error amplifier, based on the reference voltage and a voltage indicative of the output voltage, an amplified error signal. The voltage indicative of the output voltage may directly or indirectly derived from the output voltage. For example, said voltage may be derived from the output voltage with the help of one or more voltage divider circuits. The feedback circuit may also comprise a compensation capacitor coupled between the output of the error amplifier and the coupling node. Moreover, the feedback circuit may further comprise a driver circuit configured to receive the amplified error signal generated by the error amplifier, and to generate the control signal based on said amplified error signal.

According to another aspect, a method for operating a power converter is described. The method may comprise steps which correspond to the features of the power converter described in the present document. In particular, the method may be tailored for the operation of a power converter comprising a pass device and a replica device, wherein the pass device is coupled on a first electrical path between an input terminal of the power converter and an output terminal of the power converter, wherein the replica device is coupled on a second electrical path between the input terminal and the output terminal, and wherein a coupling node is arranged on the second electrical path between the replica device and the output terminal. The method may comprise generating, by a feedback circuit, based on a reference voltage and an output voltage at the output terminal, a control signal for controlling both the pass device and the replica device. The method may comprise reducing, by a regulation circuit, a voltage difference between a coupling voltage at the coupling node and the output voltage at the output terminal of the power converter. Again, the power converter may comprise a resistive element which is coupled on the second electrical path in series with the replica device between the replica device and the output terminal, and the coupling node may be arranged on the second electrical path between the replica device and the resistive element. The step of reducing may include reducing said voltage difference by regulating said coupling voltage.

The regulation circuit may comprise a regulation transistor which is a metal-oxide-semiconductor field-effect transistor MOSFET, and the regulation circuit may comprise a voltage controlled current source VCCS whose inputs are connected to the output terminal of the power converter and to the coupling node, respectively, and whose output is coupled to a gate of the regulation transistor. The method may comprise reducing said voltage difference by regulating the coupling voltage via a drain-source-channel of the regulation transistor. In case the regulation transistor is a p-channel MOSFET, the method may comprise coupling a compensation capacitor between the gate of the regulation transistor and the output terminal of the power converter. In case the regulation transistor is an n-channel MOSFET, the method may comprise coupling a compensation capacitor between the gate of the regulation transistor and a reference potential. In case the regulation transistor is an n-channel MOSFET, the method may comprise coupling a compensation capacitor between the gate of the regulation transistor and the output terminal of the power converter.

The regulation circuit may comprise an offset voltage generation unit configured to generate an offset voltage at one of the inputs of the VCCS.

The regulation circuit may comprise a first transistor coupled between the coupling node and a reference potential, a second transistor coupled between the output terminal of the power converter and a source node, and a current source coupled between the source node and the reference potential. The method may comprise connecting both a gate of the first transistor and a gate of the second transistor to said source node.

The method may comprise generating, by an error amplifier, at an output of the error amplifier, based on the reference voltage and a voltage indicative of the output voltage, an amplified error signal. The method may comprise coupling a compensation capacitor between the output of the error amplifier and the coupling node.

The method may comprise receiving, by a driver circuit, the amplified error signal generated by the error amplifier. The method may comprise generating, by the driver circuit, the control signal based on said amplified error signal. The method may comprise connecting a decoupling capacitor between the input terminal of the power converter and a reference potential.

The pass device may be a pass transistor, the control signal may be applied to a gate of the pass transistor, the replica device may be a replica transistor, and the control signal may be applied to a gate of the replica transistor. The method may comprise regulating, by the pass transistor, a first current through the first electrical path. Further, the method may comprise regulating, by the replica transistor, a second current through the second electrical path.

According to a further aspect, a software program is described. The software program may be adapted for execution on a processor and for performing the method steps outlined in the present document when carried out by the processor.

According to another aspect, a storage medium is described. The storage medium may comprise a software program adapted for execution on a processor and for performing the method steps outlined in the present document when carried out by the processor.

According to a further aspect, a computer program product is described. The computer program product may comprise instructions for performing the method steps outlined in the present document when carried out by the processor.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which.

DESCRIPTION

Figure 1:
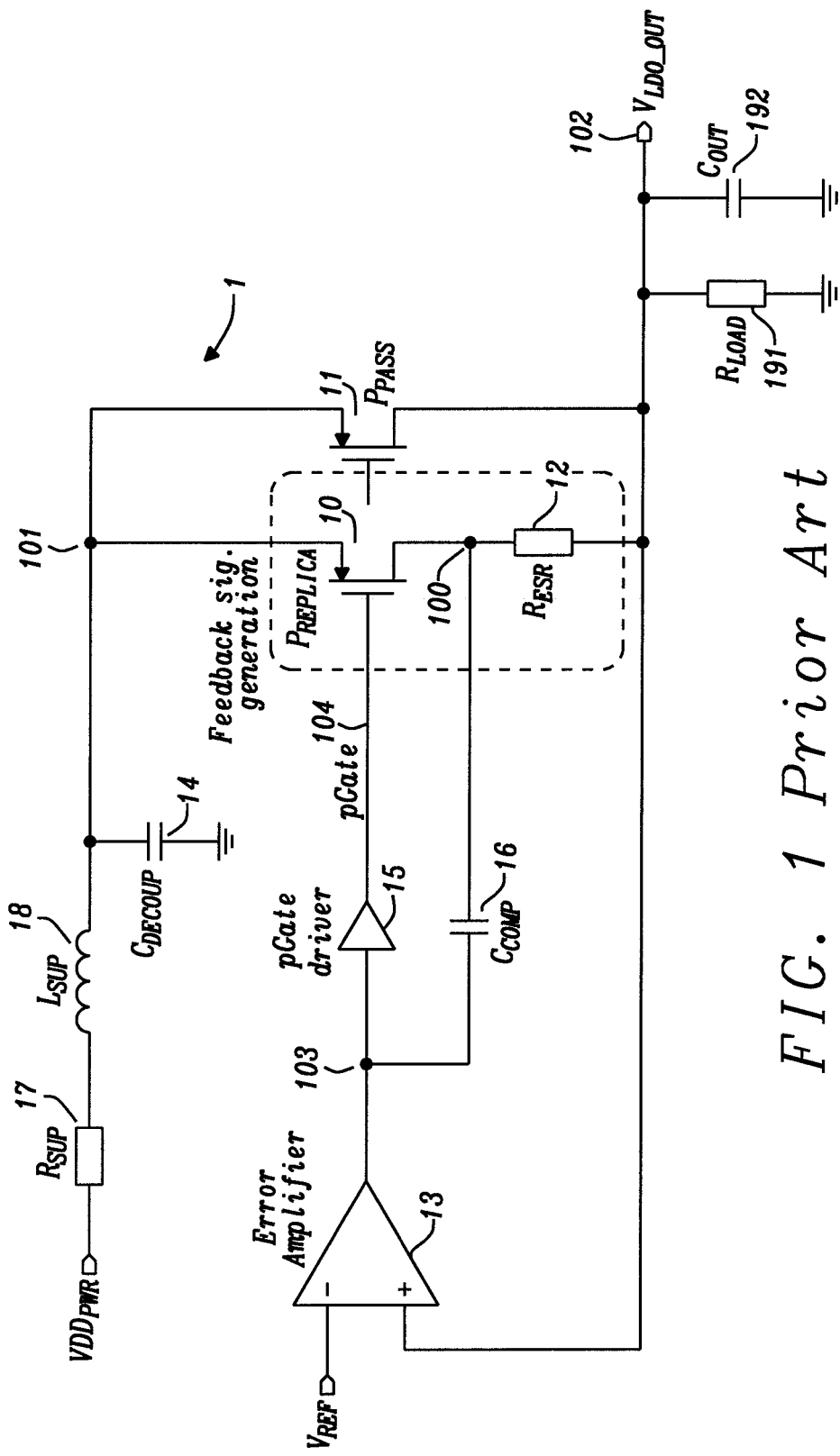
FIG. 1 shows an LDO topology that may show weakness in stability at small differences between the input voltage and the output voltage.

FIG. 1 shows an LDO topology that may show weakness in stability at small differences between the input voltage and the output voltage $V_{LDO\_OUT}$. To be more specific, FIG. 1 shows an exemplary power converter 1 comprising a pass device 11 coupled on a first electrical path between an input terminal 101 of the power converter 1 and an output terminal 102 of the power converter 1. A replica device 10 is coupled on a second electrical path between the input terminal 101 and the output terminal 102, wherein a coupling node 100 is arranged on the second electrical path between the replica device 10 and the output terminal 102. The illustrated power converter 1 also comprises a feedback circuit for generating, based on a reference voltage and an output voltage at the output terminal 102, a control signal 104 for controlling both the pass device 11 and the replica device 10. The power converter 1 further comprises a resistor 12 (resistive element) coupled on the second electrical path in series with the replica device 10 between the replica device 10 and the output terminal 102, wherein the coupling node 100 is arranged on the second electrical path between the replica device 10 and the resistor 12. In FIG. 1, the depicted feedback circuit comprises an error amplifier 13 for generating, at an output of the error amplifier, based on the reference voltage and a voltage indicative of the output voltage, an amplified error signal 103. The feedback circuit also comprises a compensation capacitor 16 coupled between the output of the error amplifier and the coupling node 100. The feedback circuit further comprises a driver circuit 15 configured to receive the amplified error signal 103 generated by the error amplifier 13, and to generate the control signal 104 based on said amplified error signal 103. The driver circuit 15 may be implemented e.g. by a sequence of current mirrors. A decoupling capacitor $C_{DECOUP}$ 14 is connected between the input terminal of the power converter and a reference potential.

At the input terminal 101, a parasitic resistance of the external wiring is modelled with the help of resistor $R_{SUP}$ 17 and a parasitic inductance of the external wiring is modelled using inductor $L_{SUP}$ 18. At the output terminal 102, a load resistor $R_{LOAD}$ 191 and an output capacitor $C_{OUT}$ 192 are depicted.

In FIG. 1, when the supply voltage $VDD_{PWR}$ gets close to the target output voltage, the feedback circuit may lose stability at certain values of wiring resistances $R_{SUP}$ and inductances $L_{SUP}$. To stabilize the feedback circuit, relatively big decoupling capacitors $C_{DECOUP}$ 14, e.g. in the range of 1 µF to 20 µF, are required. One main reason for this instability appears to be the disrupted operation of the feedback signal generation circuit comprising the replica device $P_{REPLICA}$ 10 and the resistor $R_{ESR}$ 12. In FIG. 1, said feedback signal generation circuit is highlighted using a dashed rectangle. At high load currents and small differences between $VDD_{PWR}$ and $V_{LDO\_OUT}$, the current through $P_{REPLICA}$ does not match the current through $P_{PASS}$ and the negative feedback loop of LDO power converter 1 is disrupted. The voltage drop over $R_{ESR}$ causes a significant relative difference on the drain-source voltages between $P_{PASS}$ and $P_{REPLICA}$ at the above mentioned conditions.

It should be mentioned that, in the depicted example circuit, resistor 12 forms part of a second feedback loop which comprises the resistor 12, the compensation capacitor 16, and the driver circuit 15. This second feedback loop increases stability of the output voltage regulation, and is faster than the described feedback circuit comprising the error amplifier 13 and the driver circuit 15.

Figure 2:
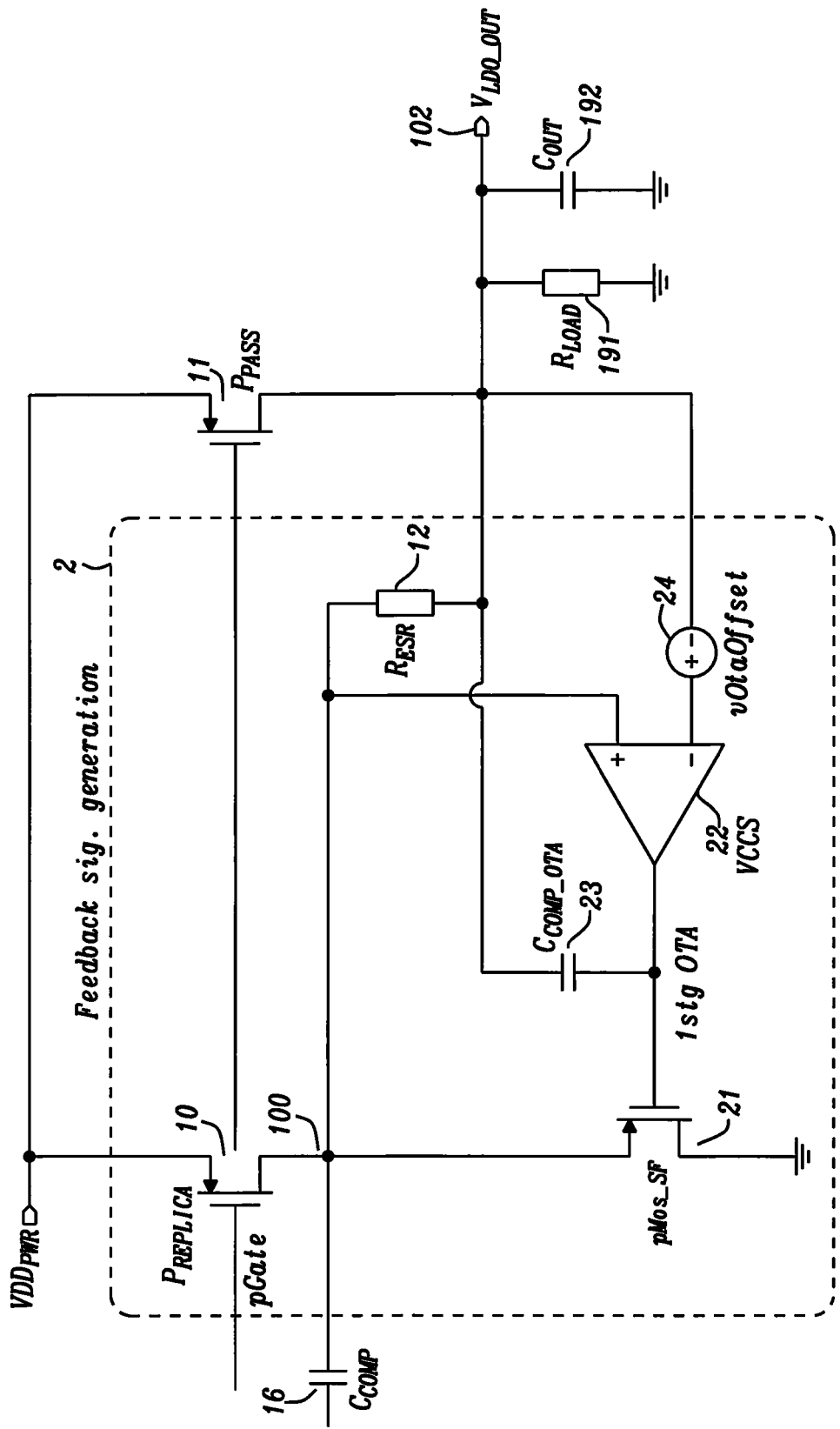
FIG. 2 shows an exemplary circuit for feedback signal generation.

FIG. 2 shows a proposed, exemplary circuit for feedback signal generation. The exemplary feedback signal generation circuit displayed within the dashed rectangle 2 may be used e.g. within the context of the exemplar power converter 1 illustrated in FIG. 1 by replacing the feedback signal generation circuit in FIG. 1 (which comprises the replica device 10 and the resistor 12).

Further, in the illustrated figures, identical reference numerals denote similar or identical circuit components and the description of said identical reference numerals may be omitted for some of the figures to avoid repetition.

In FIG. 2, an exemplary regulation circuit comprises a regulation transistor 21 which is a metal-oxide-semiconductor field-effect transistor MOSFET and an operational transconductance amplifier OTA 22 whose inputs are connected to (a) the output terminal of the power converter via an offset voltage generation unit 24 and (b) to the coupling node 100, and whose output is coupled to a gate of the regulation transistor 21. The offset voltage of the offset voltage generation unit 24 may be determined e.g. by determining a standard deviation or similar measure of an offset of the OTA 22. The voltage difference between the coupling node 100 and the output terminal is reduced by regulating the coupling voltage via a drain-source-channel of the regulation transistor 21. In this example, the regulation transistor is a p-channel MOSFET, and the regulation circuit comprises a compensation capacitor 23 coupled between the gate of the regulation transistor and the output terminal of the power converter. This circuit arrangement of transistor 21 may also be denoted as a source-follower. The source of the regulation transistor 21 is connected to the coupling node 100 and the drain of the regulation transistor 21 is connected to a reference potential. The inverting input of OTA 22 is coupled to the coupling node 100 and the non-inverting input of OTA 22 is coupled to the output terminal of the power converter via the offset voltage generation unit 24.

The circuit depicted in FIG. 2 attempts to equalize the drain-source voltages of $P_{PASS}$ and $P_{REPLICA}$. Therefore, the circuit enables matching between the currents through $P_{PASS}$ and $P_{REPLICA}$ for all LDO supply voltage values and, as a result, stable operation is guaranteed using much smaller decoupling capacitors. The artificially introduced systematic OTA offset compensates (vOtaOffset) for the OTA random offset and guarantees that the drain voltage of $P_{REPLICA}$ stays always above $V_{LDO\_OUT}$. As a result, a transfer current may flow from the coupling node 100 via transistor 21 and compensation capacitor 23 to the output terminal 102, wherein the output terminal 102 may be regarded an alternating current AC ground for such a transfer current. The described current path of said transfer current may also be denoted as a high frequency path with regard to the frequency of the described regulation circuit, which may be regarded as a low frequency stabilization of the primary feedback circuit (which comprises e.g. the error amplifier 13). This may be beneficial to avoid extra current losses (also denoted as IDDQ increase) due to a current through $R_{ESR}$ in case the drain voltage of $P_{REPLICA}$ is kept lower than LDO output voltage.

Apart from the topology advantages mentioned in the foregoing description, $C_{COMP\_OTA}$ has extra a functionality. This compensating capacitor is used to stabilize the OTA loop up to the gain bandwidth (GBW) of the OTA loop but also to transfer load transients at the LDO output directly to the gate of the source follower providing drain-source equalization even after GBW of the OTA loop. Of course, this equalization is not as accurate as in the case of the active OTA, but it may be nevertheless beneficial. In particular, this second use of $C_{COMP\_PTA}$ is not negligible because the OTA may be based on a low power design (e.g. with $IDDQ_{OTA\_MAX}$~1 µA). Taking into account that this low power design is mandatory, the speed of the OTA loop may be limited ($GBW_{MAX}$~300 kHz) and at the same time stability has to be guaranteed up to frequencies of 10 MHz-40 MHz. In this scenario, the described output coupling through $C_{COMP\_OTA}$ may indeed be helpful.

Figure 3:
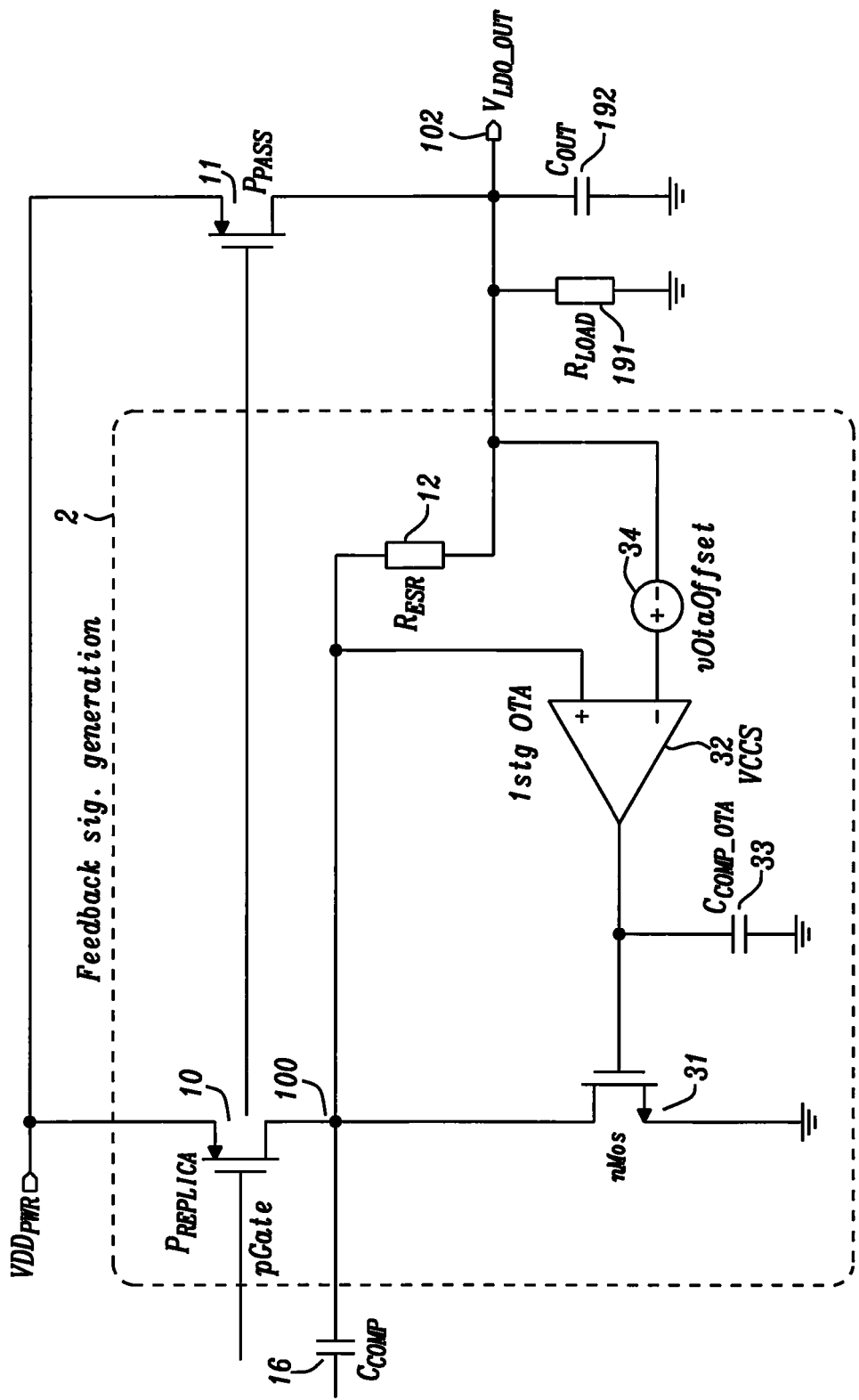
FIG. 3 shows another exemplary circuit for feedback signal generation.

FIG. 3 shows another exemplary circuit for feedback signal generation. In FIG. 3, the exemplary regulation transistor 31 is an n-channel MOSFET, and the regulation circuit comprises a compensation capacitor 33 coupled between the gate of the regulation transistor 31 and a reference potential (which may be e.g. ground). The drain of the regulation transistor 31 is connected to the coupling node 100 and the source of the regulation transistor 31 is connected to a reference potential. The non-inverting input of OTA 32 is coupled to the coupling node 100 and the inverting input of OTA 32 is coupled to the output terminal of the power converter via the offset voltage generation unit 34. The circuit displayed in FIG. 3 shows the advantage that the LDO output voltage is not limited by the threshold voltage of the regulation transistor 31. Moreover, there also area advantages resulting from the OTA design. These advantages come from the fact that the minimum OTA output voltage for this topology may be about the threshold voltage of the n-channel MOSFET regulation transistor 31. This may allow smaller output device size and while still meeting the low offset requirements for the OTA.

Figure 4:
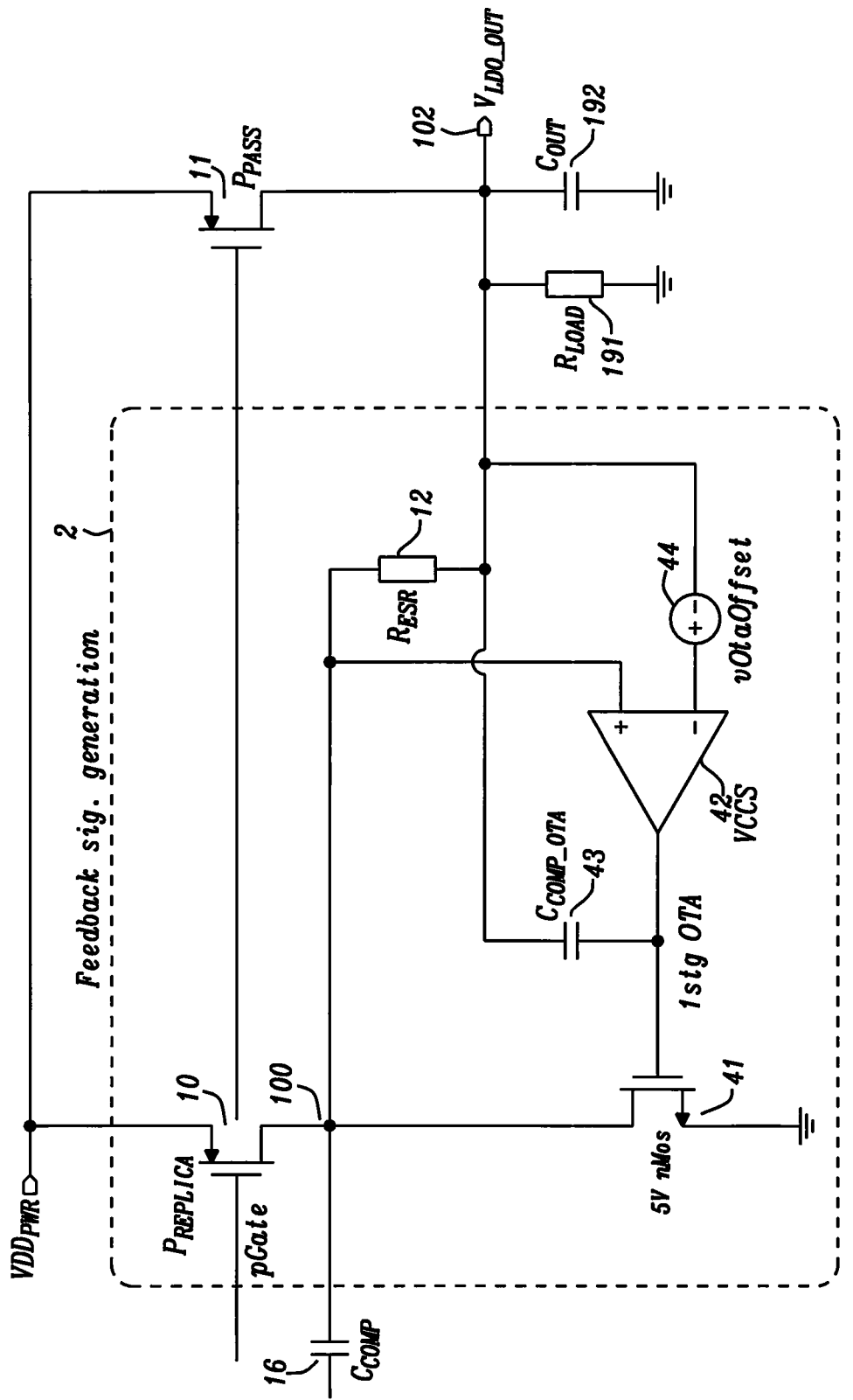
FIG. 4 shows another exemplary circuit for feedback signal generation.

FIG. 4 shows another exemplary circuit for feedback signal generation. In FIG. 4, the exemplary regulation transistor 41 is an n-channel MOSFET, and the regulation circuit comprises a compensation capacitor 43 coupled between the gate of the regulation transistor 41 and the output terminal 102 of the power converter. The drain of the regulation transistor 41 is connected to the coupling node 100 and the source of the regulation transistor 31 is connected to a reference potential. The non-inverting input of OTA 42 is coupled to the coupling node 100 and the inverting input of OTA 42 is coupled to the output terminal of the power converter via the offset voltage generation unit 44.

Figure 5:
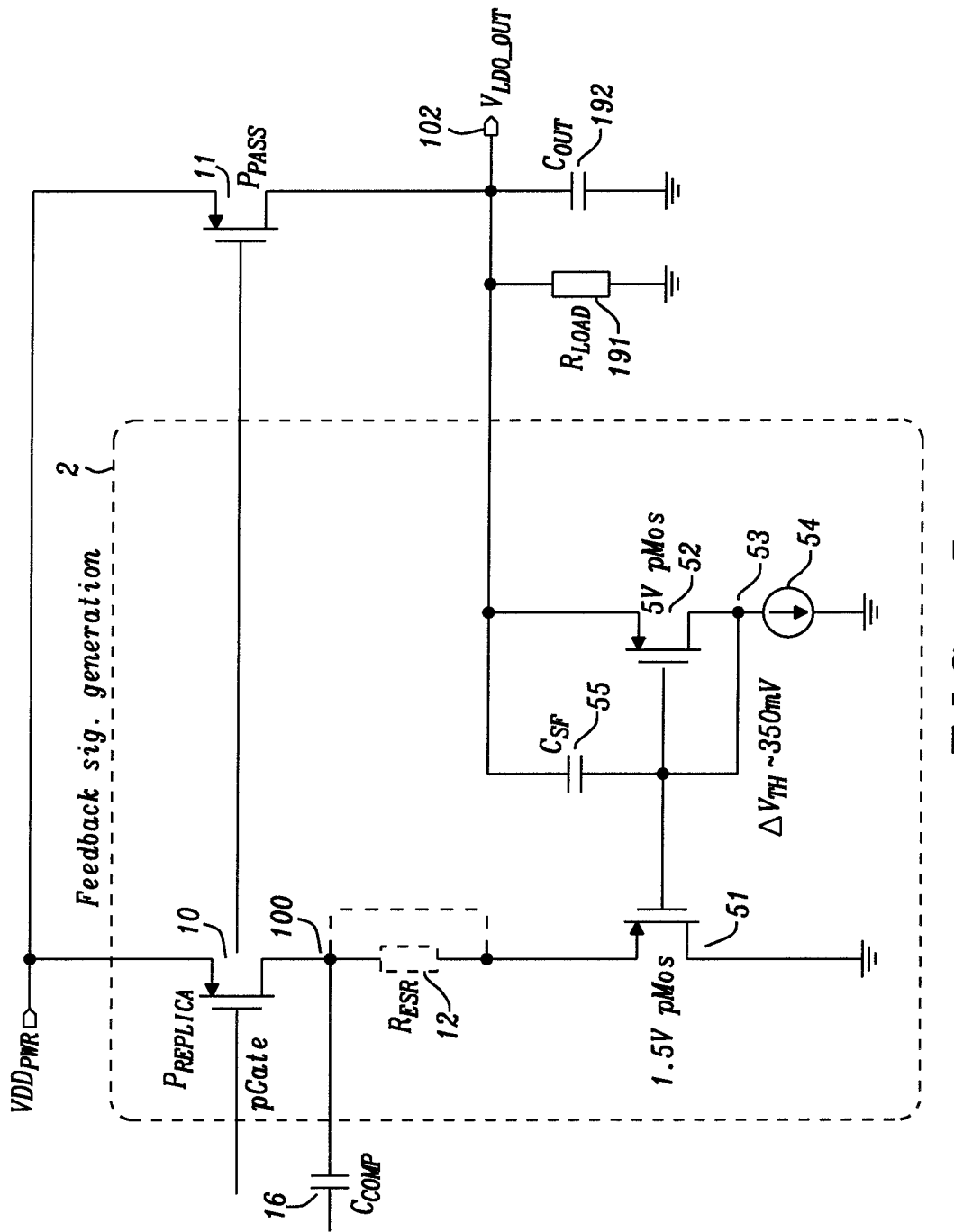
FIG. 5 shows yet another exemplary circuit for feedback signal generation.

FIG. 5 shows yet another exemplary circuit for feedback signal generation.

In FIG. 5, the exemplary regulation circuit comprises a first transistor 51 coupled between the coupling node 100 and a reference potential. The regulation circuit comprises a second transistor 52 coupled between the output terminal 102 of the power converter and a source node 53. In addition, the regulation circuit comprises a current source 54 coupled between the source node 53 and the reference potential. A gate of the first transistor 51 and a gate of the second transistor 52 are both connected to the source node 53. Additionally, a further capacitor 55 is connected between the source node 53 and the output terminal 102 of the power converter. Preferably, the first transistor 51 may have a lower threshold voltage than the second transistor 52. In this setup, the above-discussed resistor 12 may be omitted. This circumstance is illustrated in FIG. 5 by the dashed by-pass connection around said resistor 12.

The circuit in FIG. 5 implements a very simple drain-source equalizer with a PMOS source follower. The schematic relies on the threshold voltage difference between the 1.5V PMOS device 51 and the 5V PMOS device 52. Because the illustrated 1.5V device 51 has a smaller threshold voltage $V_{TH}$, the pass device $P_{REPLICA}$ 10 never enters the linear region before the pass device $P_{PASS}$ 11, when the difference between the supply voltage $VDD_{PWR}$ and the output voltage $V_{LDO\_OUT}$ is getting smaller.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter comprising
    a pass device coupled on a first electrical path between an input terminal of the power converter and an output terminal of the power converter;
    a replica device coupled on a second electrical path between the input terminal and the output terminal, wherein a coupling node is arranged on the second electrical path between the replica device and the output terminal;
    a feedback circuit configured to generate, based on a reference voltage and an output voltage at the output terminal, a control signal for controlling both the pass device and the replica device; and
    a regulation circuit configured to reduce a voltage difference between a coupling voltage at the coupling node and the output voltage at the output terminal of the power converter.

2. The power converter according to claim 1, wherein the regulation circuit is configured to reduce said voltage difference by regulating said coupling voltage.

3. The power converter according to claim 1, wherein the regulation circuit comprises
    a regulation transistor which is a metal-oxide-semiconductor field-effect transistor MOSFET; and
    a voltage controlled current source VCCS whose inputs are connected to the output terminal of the power converter and to the coupling node, respectively, and whose output is coupled to a gate of the regulation transistor;
wherein said voltage difference is reduced by regulating the coupling voltage via a drain-source-channel of the regulation transistor.

4. The power converter according to claim 3, wherein the regulation transistor is a p-channel MOSFET, and wherein the regulation circuit comprises a compensation capacitor coupled between the gate of the regulation transistor and the output terminal of the power converter.

5. The power converter according to claim 3, wherein the regulation transistor is an n-channel MOSFET, and wherein the regulation circuit comprises a compensation capacitor coupled between the gate of the regulation transistor and a reference potential.

6. The power converter according to claim 3, wherein the regulation transistor is an n-channel MOSFET, and wherein the regulation circuit comprises a compensation capacitor coupled between the gate of the regulation transistor and the output terminal of the power converter.

7. The power converter according to claim 3, wherein the regulation circuit comprises an offset voltage generation unit configured to generate an offset voltage at one of the inputs of the VCCS.

8. The power converter according to claim 1, wherein the regulation circuit comprises
    a first transistor coupled between the coupling node and a reference potential;
    a second transistor coupled between the output terminal of the power converter and a source node;
    a current source coupled between the source node and the reference potential;
wherein a gate of the first transistor and a gate of the second transistor are both connected to said source node.

9. The power converter according to claim 1, further comprising:
    a resistive element coupled on the second electrical path in series with the replica device between the replica device and the output terminal, wherein the coupling node is arranged on the second electrical path between the replica device and the resistive element.

10. The power converter according to claim 1, wherein the feedback circuit comprises
    an error amplifier configured to generate, at an output of the error amplifier, based on the reference voltage and a voltage indicative of the output voltage, an amplified error signal; and
    a compensation capacitor coupled between the output of the error amplifier and the coupling node.

11. The power converter according to claim 10, wherein the feedback circuit further comprises a driver circuit configured
    to receive the amplified error signal generated by the error amplifier, and
    to generate the control signal based on said amplified error signal.

12. The power converter according to claim 1, wherein a decoupling capacitor is connected between the input terminal of the power converter and a reference potential.

13. The power converter according to claim 1, wherein
    the pass device is a pass transistor, the control signal is applied to a gate of the pass transistor, and the pass transistor is configured to regulate a first current through the first electrical path, and
    the replica device is a replica transistor, the control signal is applied to a gate of the replica transistor, and the replica transistor is configured to regulate a second current through the second electrical path.

14. A method for operating a power converter comprising a pass device and a replica device, wherein the pass device is coupled on a first electrical path between an input terminal of the power converter and an output terminal of the power converter, wherein the replica device is coupled on a second electrical path between the input terminal and the output terminal, and wherein a coupling node is arranged on the second electrical path between the replica device and the output terminal, the method comprising:
    generating, by a feedback circuit, based on a reference voltage and an output voltage at the output terminal, a control signal for controlling both the pass device and the replica device; and reducing, by a regulation circuit, a voltage difference between a coupling voltage at the coupling node and the output voltage at the output terminal of the power converter.

15. The method according to claim 14, wherein the reducing includes reducing said voltage difference by regulating said coupling voltage.

16. The method according to claim 14, wherein the regulation circuit comprises a regulation transistor which is a metal-oxide-semiconductor field-effect transistor MOSFET, and wherein the regulation circuit comprises a voltage controlled current source VCCS whose inputs are connected to the output terminal of the power converter and to the coupling node, respectively, and whose output is coupled to a gate of the regulation transistor, the method comprising:
   reducing said voltage difference by regulating the coupling voltage via a drain-source-channel of the regulation transistor.

17. The method according to claim 16, wherein the regulation transistor is a p-channel MOSFET, the method comprising:
   coupling a compensation capacitor between the gate of the regulation transistor and the output terminal of the power converter.

18. The method according to claim 16, wherein the regulation transistor is an n-channel MOSFET, the method comprising:
   coupling a compensation capacitor between the gate of the regulation transistor and a reference potential.

19. The method according to claim 16, wherein the regulation transistor is an n-channel MOSFET, the method comprising:
   coupling a compensation capacitor between the gate of the regulation transistor and the output terminal of the power converter.

20. The method according to claim 16, wherein the regulation circuit comprises an offset voltage generation unit configured to generate an offset voltage at one of the inputs of the VCCS.

21. The method according to claim 14, wherein the regulation circuit comprises a first transistor coupled between the coupling node and a reference potential, a second transistor coupled between the output terminal of the power converter and a source node, and a current source coupled between the source node and the reference potential, the method comprising
   connecting both a gate of the first transistor and a gate of the second transistor to said source node.

22. The method according to claim 14, comprising
   generating, by an error amplifier, at an output of the error amplifier, based on the reference voltage and a voltage indicative of the output voltage, an amplified error signal; and
   coupling a compensation capacitor between the output of the error amplifier and the coupling node.

23. The method according to claim 14, comprising
   receiving, by a driver circuit, the amplified error signal generated by the error amplifier, and
   generating, by the driver circuit, the control signal based on said amplified error signal.

24. The method according to claim 14, comprising
   connecting a decoupling capacitor between the input terminal of the power converter and a reference potential.

25. The method according to claim 14, wherein the pass device is a pass transistor, the control signal is applied to a gate of the pass transistor, the replica device is a replica transistor, and the control signal is applied to a gate of the replica transistor, the method comprising
   regulating, by the pass transistor, a first current through the first electrical path, and
   regulating, by the replica transistor, a second current through the second electrical path.

* * * * *